Sept. 29, 1936.  A. LÉTREUX  2,055,935
APPARATUS FOR AUTOMATICALLY MEASURING VOLUMES OF GRAINS
Filed Sept. 14, 1934  2 Sheets-Sheet 1

A. Létreux
INVENTOR

By Glascock Downing & Seebold
Attys.

Sept. 29, 1936.  A. LÉTREUX  2,055,935
APPARATUS FOR AUTOMATICALLY MEASURING VOLUMES OF GRAINS
Filed Sept. 14, 1934  2 Sheets-Sheet 2

A. Létreux
INVENTOR

By Glascock Downing & Seebold
Attys.

Patented Sept. 29, 1936

2,055,935

UNITED STATES PATENT OFFICE 2,055,935

APPARATUS FOR AUTOMATICALLY MEASURING VOLUMES OF GRAINS

Albert Létreux, Constantine, Algeria

Application September 14, 1934, Serial No. 744,059
In France September 25, 1933

10 Claims. (Cl. 73—217)

The present invention has reference to an apparatus for automatically measuring granular substances in bulk such as the grains of cereals, its primary object being to provide such an apparatus of entirely automatic operation, adapted to volumetrically measure with accuracy and rapidity any quantities of granular substances regardless of their specific gravity and to indicate the number of volume units thus measured by an easy reading.

A further object of the invention is to provide an automatic measuring apparatus for granular substances the operation of which is continuous and requires no supervision, the measuring steps taking place uninterruptedly between an inlet feeding hopper and an outlet discharging bin by a cyclic operation comprising simultaneous filling and emptying of different buckets forming part of a system of co-related buckets pivotally mounted bodily on a common axis.

A still further object of the invention is to provide an automatic measuring apparatus for granular substances wherein proper operation and accurate measurement as performed by a timely rotation of the buckets are responsive to the proper ingress of the granular substance into the bucket being filled and to the proper and even egress of the granular substance out of the bucket being emptied, any disturbance or irregularity in said ingress or egress of the granular substance automatically stopping the apparatus at once and precluding any inaccurate measurement.

Still a further object of the invention is to provide an automatic measuring apparatus as aforesaid of simple construction, light weight and reliable operation, requiring no labor to watch over it while it works and adapted to give correct measuring indications even when mounted on vibrating machines or plants such as threshing or harvesting machines or in mills.

Still another object of the invention is to provide an apparatus possessing the foregoing advantages having a rugged and self-contained structure and occupying a minimum space.

With these and such other objects in view as will incidentally appear hereafter, the invention comprises the novel construction, arrangement and combination of parts and elements that will now be described, reference being had to the accompanying drawings wherein is illustrated, by way of example, a constructional embodiment of the invention.

In the drawings:

Figure 1 is an elevational view partly in section of the apparatus showing the same in a position for which the filling of the top bucket begins, the automatic shutter being in correct position to permit the filling of said bucket to take place, one side of the grain-receiving bin located at the bottom of the apparatus being removed to show the construction of a rockable plate operating in said bin, said plate being represented in its raised position.

Like reference numerals designate like parts throughout the several views.

Figure 1:
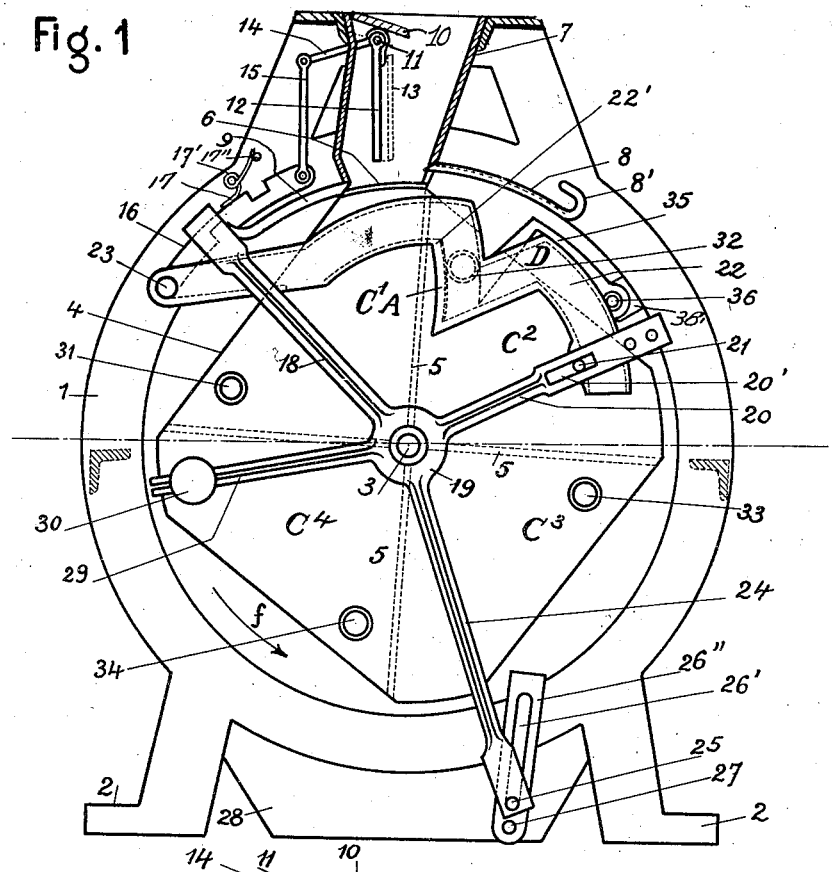

As illustrated, the apparatus comprises a substantially circular upstanding frame 1 supported by legs 2 and provided in a more or less central position with a shaft 3. On this shaft can rotate or pivot a system of buckets so integrally united bodily as to constitute a measuring drum 4. In the present embodiment, the drum 4 is divided by radial partitions 5 into four equally sized and symmetrically disposed compartments or buckets $C^1$, $C^2$, $C^3$, $C^4$.

The periphery of the drum 4 and the arrangement of the partitions 5 are such as to give to said buckets the dissymmetrical shape shown so as to permit the step by step rotation of the drum 4 under gravitational stresses, in the direction shown by the arrow $f$.

The four buckets $C^1$, $C^2$, $C^3$, $C^4$ have exactly the same capacity, and each of them communicates with the exterior only through a mouth or opening 6 constituted by a segment of the circular periphery of the drum. In other words, the peripheries of the buckets are closed between the openings 6. The size of the mouth or opening 6 is substantially equal to that of the lower outlet of a flaring hopper or chute 7 secured to the top of the frame 1. The hopper 7 is vertically disaligned relative to the shaft 3 of the drum 4 so as to permit the step-by-step rotation of the drum under gravitational stresses, in the direction shown by the arrow $f$, as will presently appear. The relative sizes of the drum 4 and hopper 7 are such that, in four equidistant angular positions tions of the drum, the outline of the lower outlet of the hopper 7 and the outline of the bucket mouth 6 located thereunder at the same moment register as truly as possible. Moreover, the hopper 7 is so sized and disposed that the circular periphery of the drum 4 contacts slidably with the edges of its lower outlet.

The right side wall of the hopper 7 (see Fig. 1) is formed adjacent to its lower end with a slot through which a manually actuated shutter 8 provided with a handle 8' can be shifted for the purpose of closing or opening at will the lower outlet of the hopper 7. The left side wall of the latter advantageously has the sinuous profile as shown; its lower end is slotted for allowing the traversing motion of an automatically operated shutter 9, as will be described hereafter.

The top of the hopper 7 is fitted internally with a small cover shield 10 which slopes downwardly from the brink of the upper inlet end of the hopper towards its interior capacity and which extends over a portion of its cross sectional area.

Under the cover shield 10 is located a horizontal pin 11 to which is suspended a board 12 which can rock to an extent limited, on the one hand, by the left side wall of the hopper 7 and, on the other hand, by a pair of aligned abutments 13 secured to the end walls of said hopper.

The board 12 forms a rocker or trip as will be described hereafter, and it is connected by links 14, 15 to a latch 16 comprising, in the present embodiment, an arcuate lever subjected to the pressure of the one leg of a spring 17 which is coiled around a pin 17' carried by the frame and has its other leg abutting against a pin 17" also carried by the frame. The latch 16 has a notch 16' on its inner face for engagement by a shoulder 9' formed on the shutter 9 (see Fig. 2).

The shutter 9 is carried by the parallel arms 18 of a pair of spiders located on both sides of the drum 4. Said arms 18 are interconnected by a cross tie 18a capable of engaging the notch 16' in the latch 16, as will be described hereafter. The hub 19 of each spider is mounted for free rotation on the pin 3. The motion of the shutter 9 is thus co-related to the pivotal motion of the spider in the one or the other direction with respect to the shaft 3.

Figure 2:
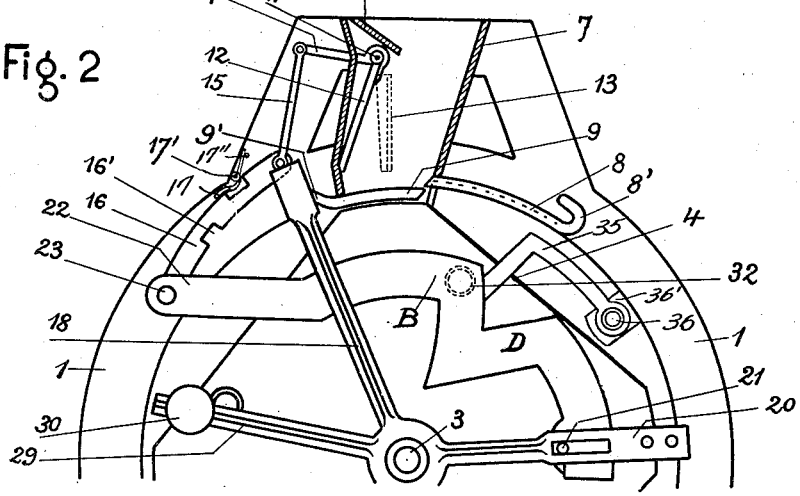
Figure 2 is a fragmentary elevational view, also partly in section, showing the upper portion of the apparatus, after the automatic shutter has been shifted to hopper closing position.
Figure 3:
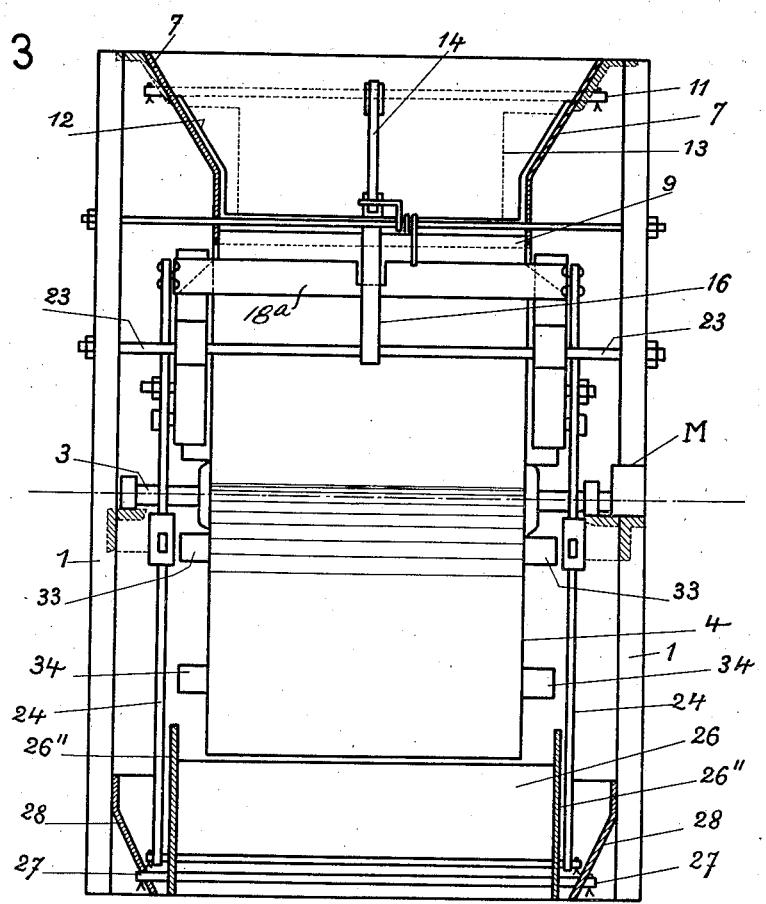
Figure 3 is an elevational view taken at right angles to Figure 1.

Each of the second arms 20 of each four-armed spider (considering the sequence of its arms clockwise) has a slot 20' into which permanently engages a pin 21 formed on, or secured to, a lever 22 of channel section having the arcuate and undulated or indented outline as shown in Figures 1 and 2. The pin 21 and slot 20' form a lost-motion connection between the spider arm 20 and the lever 22. The apparatus comprises two similar levers 22 which are pivotally mounted on an interconnecting common transverse spindle 23 attached to the latch 16 and held in the uprights of the frame 1 (see Fig. 3). Said levers 22 are adapted to perform the function of cams, as will presently appear. They are connected to the trip 12 by a toggle constituted by the members 14, 15, 16.

Each of the third arms 24 of each four-armed spider (considering the sequence of its arms clockwise) is provided at its outer end with a stud 25 permanently engaged into a slot 26' formed in the end flange 26" of a board or plate 26 pivotally carried by pins 27 secured to the opposite end walls of a bin 28 secured to the frame of the apparatus. The bin 28 has an open bottom and serves for discharging the granular or like substance after it has passed through the respective buckets for measuring purposes. The plate 26 is of such a size as to permit proper discharge of the grain from the drum buckets.

Still considering the spiders in a clockwise direction, each of their fourth arms 29 carries a counterweight 30 the position of which along said arm can be adjusted for modifying the conditions of equilibrium of the spider.

On each side plate of the system of buckets constituting the measuring drum 4 and slightly behind the partitions 5 (considering the direction of rotation as shown by the arrow f) are secured outer equidistant roller abutments 31, 32, 33, 34. The positions of the latter are such that they engage in turn with the lever 22 which is channel-shaped in cross section to co-operate with them. The arrangement of parts is such that one of the four roller abutments carried by each side plate of the drum 4 is always in engagement with the lever 22 which is adapted to be acted on by said roller abutments after the fashion of a cam with a view to periodically actuating the automatic shutter 9.

With each cam lever 22 provided, as aforesaid, on each side of the drum 4 is associated a lock 35 pivotally mounted on a pin 36 carried by a lug 36' secured to the frame 1. The lock 35 periodically engages in the channeled lever 22 (see Fig. 1) and is moved outwardly off its locking position by the roller abutments 31, 32, 33, 34 as they sequentially move along the lever 22, after reaching the position indicated by D in Figure 1. The lock 35 afterwards falls back by gravity and again engages the lever 22 as soon as the roller abutment which has just moved it off has reached the position indicated by A. The lever 22 is provided with a stop for limiting the downward movement of the lock 35.

As both cam levers 22 are secured to the same spindle 23, they are bound to move angularly in true synchronism and to exactly equal extents. This also applies for both spiders whose arms 18, 20, 24 are connected together so as to build a bodily movable duplicated unit.

The operation of the apparatus takes place as follows:—Assuming the apparatus to be in the position shown in Figure 1, it will be understood that the loose granular substance supplied by any feeding source flows through the hopper 7 into the bucket C¹ which thus becomes progressively filled thereby. As the granular substance thus filling the bucket flows along the rocker or trip 12 which is upwardly protected by the cover shield 10, it has no action on said trip. While the bucket C¹ is thus being filled, the drum 4 is prevented from rotating by the fact that both roller abutments 32 are held in the two symmetrical cams 22 in the position shown by A (Fig. 1). The cams 22 are in turn prevented from rotating due to the spiders being then held against motion by the engagement of the cross tie 18a by the notch 16' in the latch 16 which is held by the spring 17.

As soon as the bucket C¹ has been filled with granular substance, the latter collects and heaps up in the hopper 7 while pushing the rocker or trip 12 towards the left (looking at Fig. 1). The trip 12 is thus rocked about its pivot and its rocking motion is transmitted by the system of links 14, 15 to the latch 16. This action raises such latch about the spindle 23 against the antagonism of the spring 17. When reaching the position shown in Figure 2, the notch 16' in the latch 16 frees the shoulder 9' on the shutter 9 as well as the cross tie 18ª connecting the arms 18 of the spiders (see Fig. 3).

As the spiders are now free to pivot in a clockwise direction about the pin 3, they permit the cam levers 22 to pivot in the same direction, gravitationally, so as to travel from the position shown in Figure 1 to the position shown in Figure 2 while driving the spider clockwise. The roller abutment 32 thus travels from the position shown at A to the position shown at B. In other words, it escapes the shoulder 22' of the cam lever 22 which, before such escapement took place, was preventing the drum 4 from rotating. Rotation of the drum 4 then takes place but inasmuch as the spider has pivoted a short while before (approximately to the extent of 20°) and the opening 6 has accordingly been automatically closed by the shutter 9, the granular substance which is then contained in the hopper 7 cannot escape therefrom. Any leakage and any error in the measuring operation are thus precluded.

Figure 4:
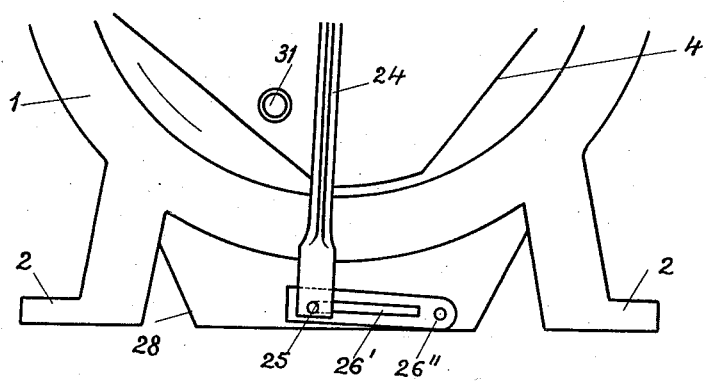
Figure 4 is a fragmentary elevational view showing the lower portion of the apparatus, in the position corresponding to Figure 2, one side of the bottom bin being removed to show the rockable plate which is represented in its lowered position.

The drum 4 being then urged gravitationally by the weight of the granular substance contained in the bucket C¹ rotates to the extent of 90°. The granular substance then begins to escape from said bucket and falls into the outlet bin 28. While this action takes place, each roller abutment 33 has come into engagement with each cam lever 22 and into contact with each shoulder 22' after having hit the same at the position shown at D and after having thus raised said cam lever while simultaneously urging back the duplicated spider to the position shown in Figure 1. The arms of the spiders thus bring the shutter 9 rearwards which causes its shoulder 9' to come into engagement with the notch 16' of the latch 16 under the action of the spring 17. The rocker or trip 12 has then resumed its position as shown in Figure 1 and the plate 26 which has previously been rocked down under its own weight to a horizontal position (see Fig. 4) has resumed its vertical position.

Thus the apparatus is in proper feeding or refilling position for the second time but it is then the bucket C² which has its mouth underneath the lower outlet of the hopper 7.

As the granular substance continues to flow down through the hopper 7, it fills the bucket C² so that its pressure can thereafter rock the trip 12 to the left, as in the preceding operation. A new tripping action thus takes place. The sequence of steps as described hereinbefore is then repeated and the drum 4 rotates to a further extent of 90° (while the shutter 9 is closed) and again reaches a feeding position after having raised the plate 26 and after having completely caused the granular substance that still remained in the bucket C¹ owing to the position previously occupied by its opening 6, to be discharged into the bin 28 whence said substance is evacuated to any suitable container (not shown).

A third cycle of operations then starts as the mouth or opening 6 of the bucket C³ has reached its filling position in coincidence with the lower end of the hopper 7, and the next tripping action takes place. However the operation of the apparatus may be stopped or slackened if somehow the granular substance discharged into the bin 28 is prevented from freely flowing away and thus exerts a sufficient pressure on the plate 26 for preventing it from rocking down that is to say for holding it in the raised position shown in Figure 1. In other words the plate 26 is allowed to rock down and to permit rotation of the drum 4 only after complete emptying of the bin 28 and corresponding bucket. Any error of measure is thus precluded.

The operation then continues in the same way. A totalizing counter M of any known or approved construction driven by the axis or pin 3 indicates the units, each of which corresponds to the full capacity of each bucket. This permits a very easy reading whereby the number of measured units (buckets) can be readily seen. Any leakage is precluded since no portion of the granular substance can escape during its travel from the hopper 7 to the bin 28 owing to the coordinated action of the drum 4 and automatic shutter 9.

It will be seen that, owing to the construction just described, each successive tripping action which causes the drum 4 to rotate to the extent of $$\frac{360°}{n}$$

($n$ designating the number of buckets) can only take place after the bucket whose mouth registers with the lower outlet of the hopper 7 has been completely filled.

The drum 4 which, for a broader understanding of the invention, must be regarded as a system of buckets commonly mounted for rotation about a single shaft such as 3, the buckets of any suitable capacity being arranged to extend outwardly from said shaft.

The apparatus may be built according to any desirable size and is specially utilizable in mills or more generally in all places where it is sought to accurately measure volumetrically granular or similar loose substances in bulk rapidly and with a minimum of labor and expense.

What I claim is:—

1. An apparatus for automatically measuring volumes of grains comprising, in combination with a gravitationally rockable system of equal buckets bodily mounted to rotate about a common shaft and having respective abutments projecting sidewise, an overlying feed hopper having an outlet equal to the mouth of each bucket and an underlying discharge bin, a trip in the hopper, cam means co-operating with the bucket abutments, a shutter movable across the hopper outlet, a pivotable balanced member articulated to the cam means, and a toggle associated with said trip, balanced member and shutter, the trip being actuated by the pressure of the grains rising in the hopper after filling of the underlying bucket for causing the toggle to permit closing of said shutter and allowing said bucket to rock to discharging position, the toggle and cam means bringing the trip and shutter back to inoperative position responsive to gravitational rocking of said bucket to discharging position.

2. An apparatus for automatically measuring volumes of grains comprising, in combination with a gravitationally rockable system of equal buckets bodily mounted to rotate about a common shaft and having respective abutments projecting sidewise, an overlying feed hopper having an outlet equal to the mouth of each bucket and an underlying discharge bin, a trip in the hopper, rockable cam means co-operating with the bucket abutments, a pivotable balanced member articulated to the cam means, a spring-urged latch interconnecting said trip and balanced member, a shutter connected to said member and movable thereby across the hopper outlet to opening and closing positions responsive to the impulses of the bucket-actuated cam means on said balanced member, and a lock intermittently engaged and released by the abutments in succession as they travel through the cam means, said latch and member holding the cam means during the filling of each bucket in succession, the trip being actuated by the pressure of the grains rising in the hopper after filling of the underlying bucket for allowing said bucket to rock to discharging position.

3. An apparatus for automatically measuring volumes of grains comprising, in combination with a gravitationally rockable system of equal buckets bodily mounted to rotate about a common shaft and having abutments projecting sidewise, an overlying feed hopper having an outlet equal to the mouth of each bucket and an underlying discharge bin, a trip pivotally supported in the hopper, rockable cam means co-operating with the bucket abutments, a pivotable counterpoised spider articulated to the cam means, a spring-urged latch interconnecting said trip and spider, a shutter connected to said spider and movable thereby across the hopper outlet to opening and closing positions responsive to the impulses of the bucket-actuated cam means on the spider, and a lock intermittently engaged and released by the abutments in succession as they travel through the cam means, said latch and spider holding the cam means during the filling of each bucket in succession, the trip being actuated by the pressure of the grains rising in the hopper after filling of the underlying bucket for allowing said bucket to rock to discharging position.

4. An apparatus for automatically measuring volumes of grains comprising, in combination with a gravitationally rockable system of equal buckets bodily mounted to rotate about a common shaft and having abutments projecting sidewise, an overlying feed hopper having an outlet equal to the mouth of each bucket and an underlying discharge bin, a trip pivotally supported in the hopper, rockable cam means co-operating with the bucket abutments, a pivotable counterpoised spider articulated to the cam means, a spring-urged latch interconnecting said trip and spider, a plate located in the bin and rockably connected to the spider, a shutter connected to said spider and movable thereby across the hopper outlet to opening and closing positions responsive to the impulses of the bucket-actuated cam means on the spider, and a lock intermittently engaged and released by the abutments in succession as they travel through the cam means, said latch and spider holding the cam means during the filling of each bucket in succession, the trip being actuated by the pressure of the grains rising in the hopper after filling of the underlying bucket for allowing said bucket to rock to discharging position.

5. An apparatus for automatically measuring volums of grains comprising, in combination with a gravitationally rockable system of equal buckets bodily mounted to rotate about a common shaft and having abutments projecting from their side faces, an overlying feed hopper having an outlet equal to the mouth of each bucket and an underlying discharge bin, a trip in the hopper, a plate in the bin, rockable cam means co-operating with the bucket abutments, a shutter movable across the hopper outlet, a spring-urged latch connected to the trip, a pivotable four-armed spider co-axial with the system of buckets, one arm of said spider cooperating with the latch, another arm being articulated to the cam means, another arm being counterpoised and another arm having said plate located in the bin connected thereto, the shutter being connected to the spider arm cooperating with the latch, said shutter being moved by the last-named spider arm to opening and closing positions responsive to the impulses of the bucket-actuated cam means, and a lock intermittently engaged and released by the abutments in succession as they travel through the cam means, said latch and spider holding the cam means stationary during the filling of each bucket in succession, the trip being actuated by the pressure of the grains rising in the hopper after filling of the underlying bucket for allowing said bucket to rock to discharging position.

6. An apparatus for automatically measuring volumes of grains comprising, in combination with a gravitationally rockable system of buckets bodily mounted to rotate about a common shaft and having abutments projecting from their side faces, an overlying feed hopper having an outlet equal to the mouth of each bucket and an underlying discharge bin, a trip pivotally supported in the hopper, a pair of interconnected cam levers rockably located along each side of the system of buckets and co-operating with their respective abutments, a pair of pivotable counterpoised spiders encompassing the system of buckets and articulated to each cam lever, a spring-urged latch interconnecting said trip and spiders, a shutter connected to said spiders and movable thereby across the hopper outlet to opening and closing positions responsive to the impulses of the bucket-actuated cam levers on the spiders, and a lock intermittently engaged and released by the abutments in succession as they travel through the cam levers, said latch and spiders holding the cam levers stationary during the filling of each bucket in succession, the trip being actuated by the pressure of the grains rising in the hopper after filling of the underlying bucket for allowing said bucket to rock to discharging position.

7. An apparatus for automatically measuring volumes of grains comprising, in combination with a gravitationally rockable system of equal buckets arranged radially and bodily mounted to rotate about a common shaft, said buckets having abutments projecting from their side faces, an overlying feed hopper having an outlet equal to the mouth of each bucket and an underlying discharge bin, a trip pivotally supported in the hopper, a pair of interconnected cam levers channel-shaped in cross section and rockably located along each side of the system of buckets and having a sinuous outline, each cam lever co-operating with the abutments carried by the corresponding side face of the buckets, a pair of pivotable counterpoised spiders located on the respective sides of the bucket system and articulated to the cam levers, a spring-urged latch interconnecting said trip and spiders, a shutter connected to said spiders and movable thereby across the hopper outlet to opening and closing positions responsive to the impulses of the bucket-actuated cam levers on the spiders, and a lock intermittently engaged and released by the abutments in succession as they travel through the cam levers, said latch and spiders holding the cam levers stationary during the filling of each bucket in succession, the trip being actuated by the pressure of the grains rising in the hopper after filling of the underlying bucket for allowing said bucket to rock to discharging position.

8. An apparatus for automatically measuring volumes of grains comprising, in combination with a gravitationally rockable system of equal buckets arranged radially and bodily mounted to rotate about a common shaft, said buckets having roller abutments projecting from their side faces, an overlying feed hopper having an outlet equal to the mouth of each bucket and an underlying discharge bin, a trip in the hopper, a pair of rockable interconnected cam levers channel-shaped in cross section and located along each side of the system of buckets and having a sinuous outline, each cam lever co-operating in succession with the roller abutments carried by the corresponding side face of the bucket, a pair of pivotable spiders encompassing between them the system of buckets and articulated to the cam levers, a spring urged latch interconnecting said trip and spiders, a plate located in the bin and rockably connected to the spiders, a shutter connected to said spiders and movable thereby across the hopper outlet to opening and closing positions responsive to the impulses of the bucket-actuated cam levers on the spiders, and a lock intermittently engaged and released by the abutments in succession as they travel through the cam levers, said latch and spiders holding the cam levers stationary during the filling of each bucket in succession, the trip being actuated by the pressure of the grains rising in the hopper after filling of the underlying bucket for allowing said bucket to rock to discharging position.

9. An apparatus for automatically measuring volumes of grains comprising, in combination with a gravitationally rockable system of equal buckets arranged radially to rotate about a common shaft and having roller abutments projecting from their side faces, an overlying feed hopper having an outlet equal to the mouth of each bucket and an underlying discharge bin, a trip pivotally supported in the hopper, a pair of interconnected cam levers channel-shaped in cross section and rockably located along each side of the bucket system and having a sinuous outline defining shoulders, each cam lever being engaged in succession by the roller abutments carried by the corresponding side faces of the buckets, a pair of pivotable counterpoised spiders having pin and slot connections with the respective cam levers, a spring-urged latch interconnecting said trip and spiders, a shutter connected to said spiders and movable thereby across the hopper outlet to opening and closing positions responsive to the impulses of the bucket-actuated cam levers on the spiders, and a pivotable lock intermittently engaged and released by the abutments in succession as they travel through the cam levers, said latch and spiders holding said levers stationary during the filling of each bucket in succession, the trip being actuated by the pressure of the grains rising in the hopper after filling of the underlying bucket for allowing said bucket to rock to discharging position.

10. An apparatus for automatically measuring volumes of grains comprising, in combination with a frame, a gravitationally rockable system of equal buckets arranged radially to rotate about a common shaft and having equidistant roller abutments projecting from their side faces, an overlying feed hopper having an outlet equal to the mouth of each bucket and an underlying discharge bin, a board-shaped trip pivotally supported in the hopper, a shield over said trip, a pair of interconnected cam levers channel-shaped in cross section and rockably located along each side of the bucket system and having a sinuous outline defining shoulders, each cam lever being engaged in succession by the roller abutments on the corresponding side faces of the buckets, a pair of pivotable spiders encompassing between them the bucket system, each spider being counterpoised and having a pin and slot lost motion connection with the adjacent cam lever, a spring-urged latch interconnecting said trip and spiders, a shutter connected to said spiders and movable thereby across the hopper outlet to opening and closing positions responsive to the impulses of the bucket-actuated cam levers on the spiders, a board located in the bin and rockably connected to the spiders, and a gravity actuated lock pivotally mounted on each side face of the frame and intermittently engaged and released by the abutments in succession as they travel through the cam levers, said latch and spiders holding said levers stationary during the filling of each bucket in succession, the trip being actuated by the pressure of the grains rising in the hopper after filling of the underlying bucket for allowing said bucket to rock to discharging position.

ALBERT LÉTREUX.